United States Patent [19]
Oi

[11] Patent Number: 4,635,130
[45] Date of Patent: Jan. 6, 1987

[54] IMAGE READING/RECORDING APPARATUS

[75] Inventor: Takato Oi, Tokyo, Japan

[73] Assignee: Fumiaki Nukada, Japan

[21] Appl. No.: 699,634

[22] Filed: Feb. 8, 1985

[30] Foreign Application Priority Data

Feb. 11, 1984 [JP] Japan ................... 59-24153

[51] Int. Cl.$^4$ .............. H04N 1/21; H04N 1/23; H04N 1/04; H04N 1/10
[52] U.S. Cl. ........................ 358/296; 358/285; 358/293
[58] Field of Search ............ 358/296, 298, 285, 286, 358/293; 178/23 R

[56] References Cited

U.S. PATENT DOCUMENTS

| | | | |
|---|---|---|---|
| 4,314,282 | 2/1982 | Fischbeck et al. | 358/286 |
| 4,317,137 | 2/1982 | Tompkins | 358/285 X |
| 4,343,968 | 8/1982 | Toyomura | 178/23 R |
| 4,347,533 | 8/1982 | Ogawa | 358/296 |
| 4,356,347 | 10/1982 | Wiener | 358/296 X |
| 4,404,598 | 9/1983 | Scuilli | 358/296 |
| 4,471,375 | 9/1984 | Oritsuki et al. | 358/296 X |

Primary Examiner—E. A. Goldberg
Assistant Examiner—Patrick W. Foster
Attorney, Agent, or Firm—McGlew and Tuttle

[57] ABSTRACT

An image reading/recording apparatus comprising a reading portion having a contact-type one-dimensional image sensor, a recording portion having a contact-type one-dimensional recording head, and a selector switch portion for controlling these one-dimensional image sensor and one-dimensional recording head on a substrate is disclosed. The transmission and receiving of image information is effected by feeding a subject copy or a recording paper sheet by at least one paper feeding roller. The image reading/recording apparatus also functions as a copying machine by feeding the image information read from a subject copy by the reading portion directly to the recording portion.

9 Claims, 8 Drawing Figures

IMAGE READING/RECORDING APPARATUS

BACKGROUND OF THE INVENTION

This invention relates to an image reading/recording apparatus for reading and recording an image.

In a system where a two-dimensional image is reproduced by dividing said image into a plurality of one-dimensional picture elements, as typically represented by a facsimile system, the scanning system thereof commonly used in the early stages was of a cylindrical scanning type, as shown in FIG. 1.

On the transmit side, a subject copy 2 wrapped around a cylinder 1 is scanned by a reading head 5 having a lamp 3 and a phototube 4. Scanning operations consist of main scanning involving the rotation of the cylinder 1, and auxiliary scanning involving the movement of the reading head 5 in the direction parallel to the rotating axis 6 of the cylinder 1.

On the receive side, on the other hand, a recording paper sheet 8 wrapped around a cylinder 7 is scanned by a recording head 10 having a recording stylus 9 and other components. Scanning on the receive side is performed by main scanning involving the rotation of the cylinder 7 and auxiliary scanning involving the movement of the recording head 10 in the direction parallel to the rotating axis of the cylinder 7, as performed on the transmit side.

FIG. 2 is a diagram of assistance in explaining the relationship between the main and auxiliary scanning operations, showing the subject copy 2 wrapped around the cylinder 1, or the recording paper sheet 8 wrapped around the cylinder 7 where symbols A, B, C and D refer to the four corners of the subject copy 2 or the recording paper sheet 8. The main scanning is performed in the A-B direction as the cylinder 1 or 7 rotates, while the auxiliary scanning is performed as the reading head 5 or the recording head 10 moves along the A-C direction.

In recent years, however, a planar scanning system as shown in FIG. 3 has been developed to substitute for the cylindrical scanning system. In FIG. 3, a reading portion 12 on the transmit side is a linear array of multiple sensors R1, R2 ... Rn, each sensing variations in the intensity of light of a spot on a subject copy 13. Each of these sensors R1, R2 ... Rn is connected to each of the contacts S1, S2 ... Sn of a selector switch 14 in that order. When the contacts of the selector switch 14 are switched over in the sequence of S1, S2 ... Sn, the output of the sensor R1 first appears on an output signal wire 15, followed by the outputs of the 20 sensors R1, R2 ... Rn in that sequence. In this way, the main scanning in the A-B direction is performed, while the auxiliary scanning in the A-C direction is performed as a paper feeding roller 16 is rotated.

On the receive side, on the other hand, a recording portion 17 is a linear array of recording elements W1, W2 ... Wn. Each of these recording elements are connected to each of the contacts S1', S2' ... Sn' of a selector switch 18 in that order. As in the case of the transmit side, when the contacts of the selector switch on the receive side are switched over in the sequence of S1', S2' ... Sn', the recording elements are also switched over in the sequence of W1, W2 ... Wn for recording on a recording paper sheet 19. In this way, the main scanning in the A-B direction is effected on the receive side, while the auxiliary scanning in the A-C direction is effected as a paper feeding roller 20 is rotated.

In practical units, the selector switches 14 and 18 are not mechanical-contact switches, but are composed of shift registers or other appropriate means and semiconductor switches, each being usually formed on the same substrate with the reading portion 12 or the recording portion 17.

FIG. 4 shows an example of the construction of the recording portion and the selector switch portion, both formed on a single substrate 21. A recorder 22 is a thermal head consisting of a linear array of multiple heating elements H1, H2, H3 ... Hn. These heating elements are divided into two groups, each being connected to a drive portions 23a and 23b, respectively. Each of the drive portions 23a and 23b incorporates a shift register, a semiconductor switch and a thermal head drive circuit, and serves as a selector switch connected to a data input terminal 24 to select one of the multiple heating elements. As a signal is entered on a reset input terminal 25, the heating element H1 at the extreme left in the figure, for example, is selected, and then the adjacent heat elements are selected one by one every time a clock pulse input appears on a clock input terminal 26. The reading portion and the selector switch portion, both formed on a single substrate, have the same construction.

In conventional facsimile equipment of the planer scanning type, designed for performing both transmission and receiving, the transmitting and receiving portions thereof have separate paper feeding rollers, and the reading and recording portions thereof are provided on separate substrates. This makes it impossible to make the equipment compact in size since the same scanning means cannot be used for both transmission and receiving purposes.

SUMMARY OF THE INVENTION

It is an object of the present invention to provide an image reading/recording apparatus which serves as a compact facsimile of a planar scanning type, the scanning means of which can be used for both transmission and receiving.

It is another object of the present invention to provide an image reading/recording apparatus which serves as a compact copying machine as well.

It is still another object of the present invention to provide a less expensive image reading/recording apparatus by using the scanning means thereof for both transmission and receiving.

The image reading/recording apparatus of the present invention comprises a substrate, reading means formed on one side of said substrate for reading an image on a subject copy to convert said image to image information, recording means formed on said one side of said substrate for converting image information to an image on a recording paper sheet, driving means formed on said one side of said substrate for driving said reading means and said recording means, and first paper feeding means formed on said one side of said substrate for feeding either said subject copy or said recording paper sheet.

DESCRIPTION OF THE PREFERRED EMBODIMENT

Figure 1:
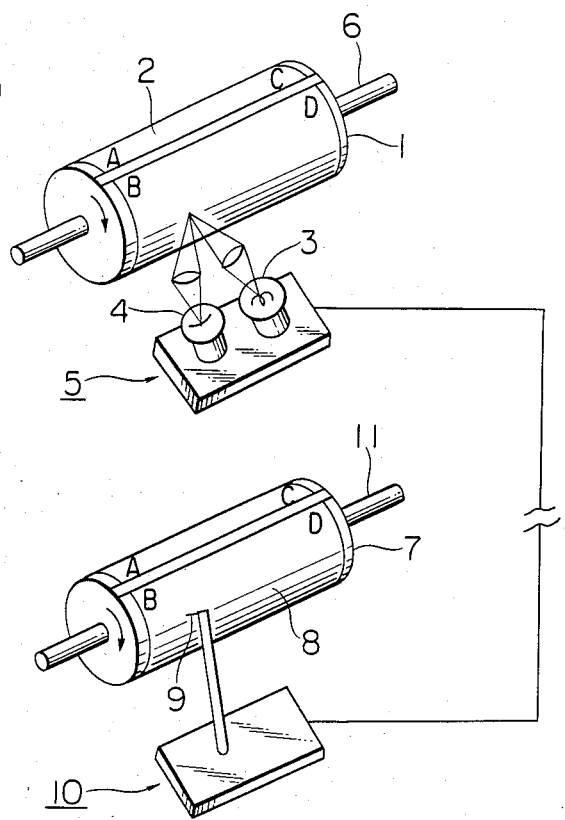
FIG. 1 is a diagram illustrating the scanning means for a facsimile of a cylindrical scanning type.
Figure 2:
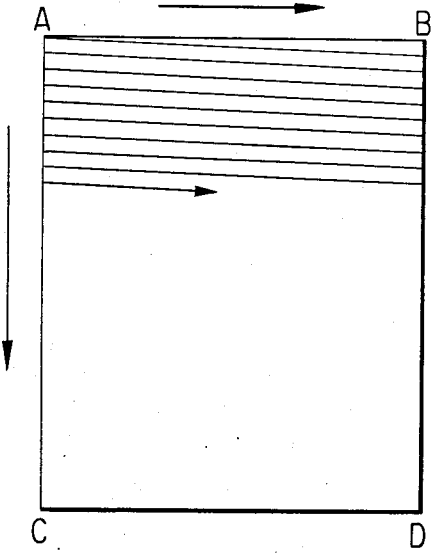
FIG. 2 is a diagram illustrating the relationship between main scanning and auxiliary scanning on a subject copy or a recording paper sheet.
Figure 3:
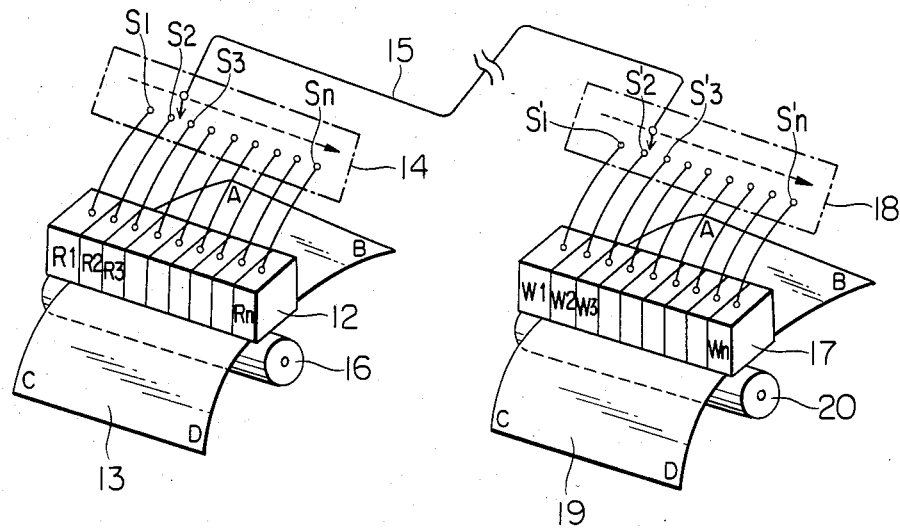
FIG. 3 is a diagram illustrating the scanning means of a facsimile of a conventional planar scanning type.
Figure 4:
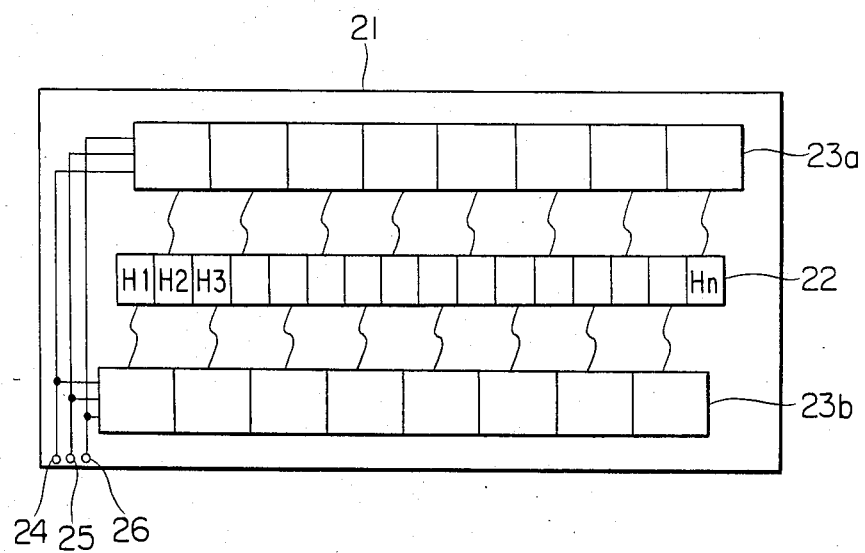
FIG. 4 is a diagram illustrating the construction of a recording portion and a selector switch portion, both formed on a single substrate.
Figure 5:
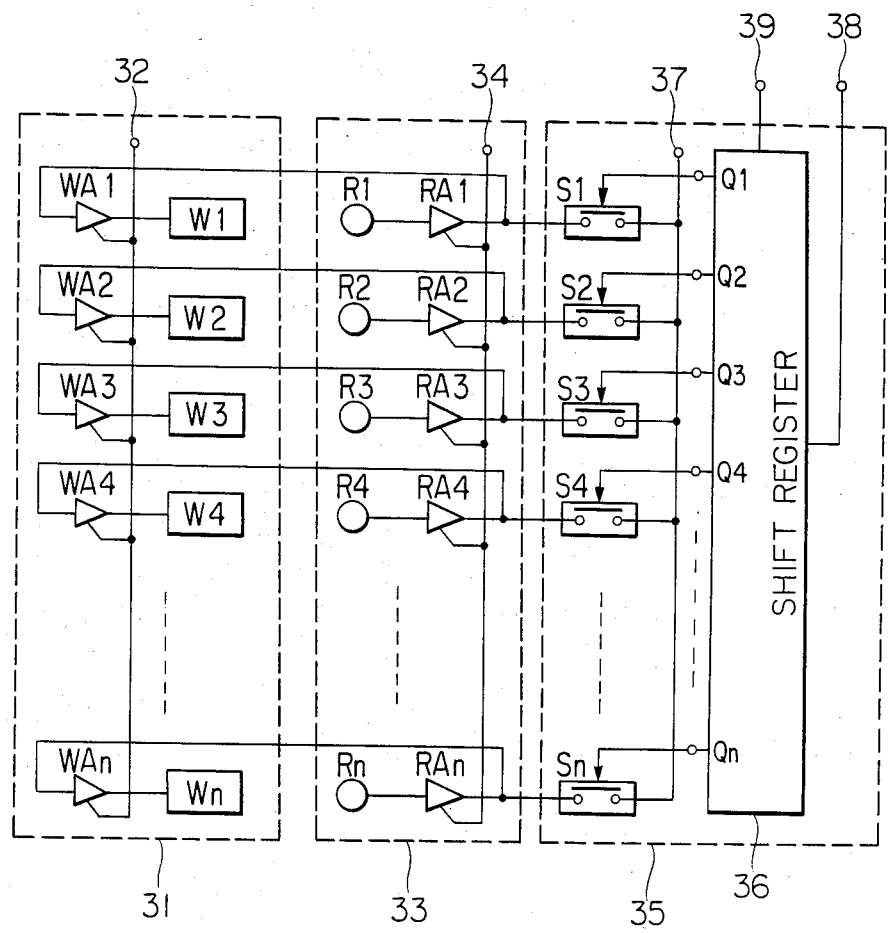
FIG. 5 is a diagram illustrating the construction of a recording portion, a reading portion and a selector switch portion, all formed on a single substrate, used in an embodiment of the present invention.

FIG. 5 shows the construction of a recording portion, a reading portion and a selector switch portion, all formed on a single substrate, in an embodiment of the image reading/recording apparatus of the present invention.

A recording portion 31 has a contact-type recording head consisting of a linear array of multiple recording elements W1, W2 ... Wn, and amplifiers WA1, WA2 ... WAn connected to the corresponding recording elements. The control terminals of these amplifiers are connected in common with an enable terminal 32 of the recording portion 31. A reading portion 33 has a contact-type image sensor consisting of a linear array of multiple reading elements R1, R2 ... Rn, and amplifiers RA1, RA2 ... RAn connected to the corresponding reading elements. The control terminals of these amplifiers are connected in common with an enable terminal 34 of the reading portion 33, with the output terminals thereof being connected to the input terminals of the corresponding amplifiers WA1, WA2 ... WAn of the recording portion 31. As the contact-type one-dimensional recording head of the recording portion 31, a thermal head, for example, can be employed, and as the contact-type onedimensional image sensor, an image sensor using photodiodes, photo-transistors, etc. as reading elements can be used.

The selector switch portion 35 is used for main scanning for both the recording portion 31 and the reading portion 33, and has switches S1, S2 ... Sn and a shift register 36. The terminals on one side of these switches are connected with the output terminals of the amplifiers RA1, RA2 ... RAn of the reading portion 33 while the terminals on the other side thereof are connected in common with the data input/output terminal 37. The control terminals of the switches S1, S2 ... Sn are connected to the corresponding output terminals Q1, Q2 ... Qn of the shift register 36. The shift register 36 has such a construction that, when a signal appears on the reset input terminal 38, only the output terminal Q1 thereof is turned ON, and when a clock pulse appears on the clock input terminal 39, only Q2 is turned ON, and thereafter the output terminals Q3, Q4 ... Qn are sequentially turned ON in the same manner. As an output terminal is turned ON, the switch connected thereto is closed.

The enable terminal 32 of the recording portion 31 is used for controlling the amplifiers WA1, WA2 ... WAn in such a manner that, when the enable terminal 32 is turned ON, the signal sent from the data input/output terminal 37 via the switches S1, S2 ... Sn is allowed to be output (the operating state), and when the enable terminal 32 is turned OFF, output impedance is increased to such a level as to prevent the signal from being output (the non-operating state). Similarly, the enable terminal 34 of the reading portion 33 is used for controlling the amplifiers RA1, RA2 ... RAn in such a manner that, when the enable terminal 34 is turned ON, the signal sent from the reading elements R1, R2 ... Rn is allowed to be output (the operating state), and when the enable terminal 34 is turned OFF, output impedance is increased to such a level as to prevent the signal from being output (the non-operating state). Consequently, when the enable terminal 32 of the recording portion 31 is turned OFF and the enable terminal 34 of the reading portion 33 is turned ON, only the reading portion 33 is allowed to operate for transmission. When the enable terminal 34 of the reading portion 33 is turned OFF and the enable terminal 32 of the recording portion 31 is turned ON, on the other hand, only the recording portion 31 is allowed to operate for receiving.

In either transmission or receiving, the shift register 36 performs the same operation. As described earlier, as the signal is input into the reset input terminal 38, the output terminals Q2, Q3 ... Qn are sequentially turned ON one by one as the clock pulses are input into the clock input terminal 39. This turns ON the switches S1, S2, ... Sn sequentially one by one. The main scanning operation is effected by the repetition of these operations. In transmission, the reading portion 33 is operated to read the image of a subject copy, and the image information obtained is output from the data input/output terminal 37 via the switches S1, S2 ... Sn of the selector switch portion 35 and sent to the receive side. In receiving, on the other hand, the recording portion 31 is operated so that the image information sent from the transmit side to the data input/output terminal 37 is input to the recording portion 31 via the switches S1, S2 ... Sn of the selector switch portion 35 to reproduce an image on a recording paper sheet.

Figure 6:
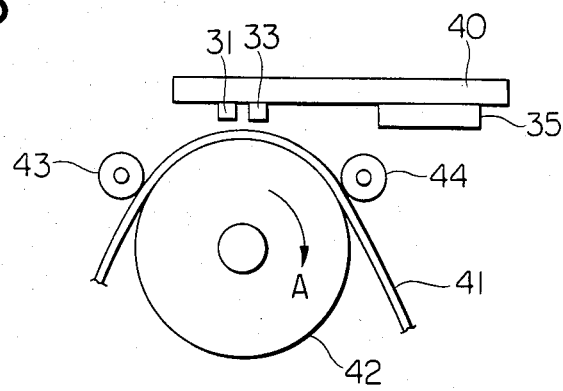
FIG. 6 is a side elevation of a scanning portion in an embodiment of the present invention.

FIG. 6 is a side elevation showing the scanning portion of the image reading/recording apparatus having recording, reading and selector switch portions as described referring to FIG. 5. On one side of a substrate 40 formed are the recording portion 31, the reading portion 33 and the selector switch portion 35 in close vicinity to each other. On the opposite side of the substrate 40 provided are the paper feeding roller 42 for feeding a paper sheet 41 as subject copy or recording medium, and two retaining rollers 43 and 44. The paper feeding roller 42 is provided in the vicinity of the recording portion 31 and the reading portion 33. The substrate 40 and the rollers 42, 43 and 44 are supported by a chassis (not shown) of the image reading/recording apparatus. When the image reading/recording apparatus is used for the transmission of image information, the recording portion 31 is put into the non-operating state, and the reading portion 33 into the operating state, as described above, referring to FIG. 5, and the paper feeding roller 42 is rotated in the direction shown by an arrow A in the figure to feed the set subject copy 41. When the reading portion 33 reads characters, patterns, etc. on the subject copy 41, the main scanning for reading is performed by the selector switch portion 35, while the auxiliary scanning is performed by paper feeding by means of the roller 42. The image information thus read is transmitted to the receive side. When the image reading/recording apparatus in this embodiment is used for the receiving of image information, on the contrary, the reading portion 33 is put into the non-operating state and the recording portion 31 into the operating state, and the set recording paper sheet 41 is fed by the paper feeding roller 42. The recording portion 31 reproduces characters, patterns, etc. on the recording paper sheet 41 based on the image information sent from the reading portion 33. As in the case of transmission, the main scanning operation is performed by the selector switch portion 35 and the auxiliary scanning operation by paper feeding by means of the roller 42.

In this embodiment where the reading, recording and selector switch portions are formed on the same substrate, only one substrate and one roller are required, enabling the scanning portion to be made compact. This helps reduce the size of the entire apparatus. Furthermore, since one selector switch portion can be used for both the reading and recording portions, the cost of the apparatus can be reduced.

Figure 7:
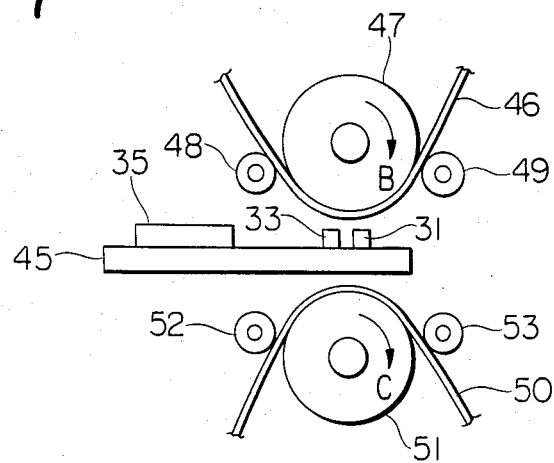
FIG. 7 is a side elevation of a scanning portion in another embodiment of the present invention.

FIG. 7 is a side elevation of a scanning portion in another embodiment of the present invention. This image reading/recording apparatus is designed as to be used not only as a facsimile unit but also as a copying machine.

In this image reading/recording apparatus, a recording portion 31 and a reading portion 33 are formed in close vicinity to one another on one side of a substrate 45 made of a transparent material. On the opposite side of the substrate 45 provided are a paper feeding roller 47 for feeding a recording paper sheet 46 and two retaining rollers 48 and 49. The paper feeding roller 47 is provided in the vicinity of the recording portion 31. On the opposite side of the transparent substrate 45 provided are a paper feeding roller 51 for feeding a subject copy 50 and two retaining rollers 52 and 53. The paper feeding roller 51 is provided in the vicinity of the reading portion 33. When this image reading/recording apparatus is used as a copying machine, both the enable terminals 32 and 34 of the recording portion 31 and the reading portion 33 are turned ON to put both the recording portion 31 and the reading portion 33 into the operating state, and the paper feeding rollers 47 and 51 are rotated at the same speed in the directions shown by arrows B and C in the figure. The image information read by the reading elements R1, R2 . . . Rn of the reading portion 33 from the subject copy 50 through the transparent substrate 45 is sent to the recording elements W1, W2 . . . Wn of the recording portion 31, which correspond with the reading elements R1, R2 . . . Rn one by one. An image is reproduced on the recording paper sheet 46 by these recording elements. In this way, this image reading/recording apparatus, when used as a copying machine, need not main scanning for reading and recording, so that copying can be performed at high speed. The operations of the image reading/recording apparatus, when used as a facsimile, is similar to those in the embodiment shown in FIG. 6. When the apparatus of this invention is used only as a copying machine, the selector switch portion 35 is not required, as is obvious from the above description.

Figure 8:
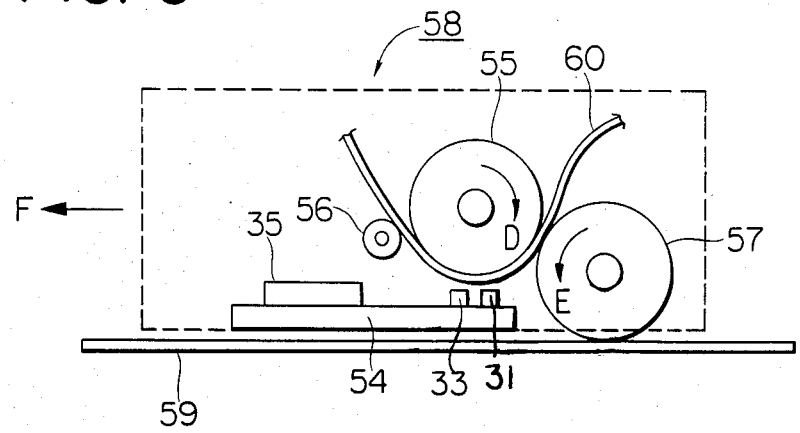
FIG. 8 is a side elevation of a scanning portion in still another embodiment of the present invention.

FIG. 8 is a side elevation of a scanning portion of still another embodiment of the present invention. The image reading/recording apparatus in this embodiment functions not only as a facsimile but also as a copying machine, as in the case of the embodiment shown in FIG. 7, and is a compact self-travelling apparatus which can read a subject copy placed on the desk, for example, while moving over the subject copy. As in the case of the embodiment shown in FIG. 7, this image reading/recording apparatus has a transparent substrate 54 on which a recording portion 31, a reading portion and a selector switch portion 35 are provided. A paper feeding roller 55 is provided on the recording portion 31 and the reading portion 33 in close vicinity to them. Furthermore, a retaining roller 56 and a travelling roller 57 are also provided. The travelling roller 57 is forced onto the paper feeding roller 55 so as to rotate as the paper feeding roller 55 is rotated. The travelling roller 57, whose rotating surface protrudes slightly from the underside of the image reading/recording apparatus 58, as indicated by dotted lines in the figure, is adapted to permit the apparatus 58 to travel by the rotation of the travelling roller 57. When this image reading/recording apparatus is used as a copying machine, the apparatus 58 is placed on a subject copy 59, and a recording paper sheet 60 is set between the paper feeding roller 55 and the travelling roller 57. As described referring to FIG. 7, the recording portion 31 and the reading portion 33 are put into the operating state, and the paper feeding roller 55 is caused to rotate in the direction shown by an arrow D. As the paper feeding roller is rotated, the recording paper sheet 60 is fed and the travelling roller 57 is caused to rotate in the direction shown by an arrow E, thus causing the image reading/recording apparatus 58 to travel over the subject copy 59 in the direction shown by an arrow F. The reading portion 33 reads the subject copy 59 through the transparent substrate 54, and transmits the read information to the recording portion 31 which in turn reproduces an image on the recording paper sheet 60.

When the image reading/recording apparatus shown in FIG. 8 is used as a facsimile, image information is transmitted by putting the recording portion 31 into the nonoperating state and the reading portion 33 into the operating state, and rotating the paper feeding roller 55 to cause the apparatus 58 to travel over the subject copy 59 without setting the recording paper sheet. The reading portion 33 reads the subject copy 59, and transmits the image information to the receive side. When receiving image information, on the contrary, the recording portion 31 is put into the operating state and the reading portion 33 into the nonoperating state, the recording paper sheet 60 is set, and the paper feeding roller 55 is caused to rotate. At this time, the apparatus is also caused to travel by the revolution of the paper feeding roller 55 and the travelling roller 57. The apparatus 58 may not be caused to travel by allowing the travelling roller 57 to run idle. The recording portion 31 reproduces an image on the recording paper sheet 60 based on the transmitted image information. In either reading or recording, main scanning is carried out by the selector switch portion 35, while auxiliary scanning is carried out by the relative movement of the subject copy 59 and the apparatus 58 in the case of reading, and by the feeding of the recording paper sheet 60 in the case of recording.

The image reading/recording apparatus of the self-travelling type has an advantage of accommodating a subject copy not only in sheet form but also in a thick book form. When this apparatus is used only as a copying machine, the selector switch portion 35 is not required, as is obvious from the above description.

What is claimed is:

1. An image reading/recording apparatus comprising
  a substrate;
  a reading portion formed on one side of said substrate for reading an image on a subject copy and converting said image to image information, said reading portion having a contact-type one-dimensional image sensor consisting of a linear array of a plurality of reading elements, and a plurality of amplifiers having control terminals, inputs and outputs and being switchable between an operating state and a non-operating state by control signals to their control terminals, inputs of said amplifiers being respectively connected to said reading elements;
  a recording portion formed on said one side of said substrate for reproducing an image on a recording paper sheet based on image information, said recording portion having a contact-type one-dimensional recording head consisting of a linear array of a plurality of recording elements, and a plurality of amplifiers having control terminals, inputs and outputs and being switchable between an operating state and a non-operating state by control signals to their control terminals, outputs of said recording portion amplifiers being respectively connected to said recording elements and inputs of said reading portion amplifiers;
  a selector switch portion formed on said one side of said substrate for scanning said reading portion and recording portion, said selector switch portion having a plurality of switches, each switch having two switch terminals, one of said switch terminals of all of said switchs being connected to respective outputs of said amplifier of said reading portion and the other of said switch terminals of all of said switches being connected to a common data input-/output terminal, said selector switch portion including a shift register having control terminals respectively connected to said switches for repeatedly and sequentially controlling an ON-OFF operation of said switches; and
  a first paper feeding roller disposed adjacent said one side of said substrate for feeding either a subject copy or a recording paper sheet past said one side of said substrate.

2. An image reading/recording apparatus set forth in claim 1 wherein said contact-type one-dimensional image sensor and said contact-type one dimensional recording head are disposed in close vicinity to each other, and said paper feeding roller is provided in the vicinity of said contact-type onedimensional image sensor and said contact-type one-dimensional recording head.

3. An image reading/recording apparatus set forth in claim 2 wherein said apparatus has means so that it can be operated as a facsimile unit in such a manner that,
  in transmission, said amplifiers of said reading portion are switched over to an operating state and said amplifiers of said recording portion are switched over to a non-operating state, said contact-type one-dimensional image sensor is operated to read the image of a subject copy fed by said first paper feeding roller, and image information obtained by said contact-type one-dimensional image sensor is output from said data input/output terminal via said amplifiers of said reading portion and said switches of said selector switch portion,
  in receiving, said amplifiers of said reading portion are switched over to a non-operating state and said amplifiers of said recording portion are switched over to an operating state, and said contact-type one-dimensional recording head is operated so that image information sent to said date input/output terminal is input to said amplifiers of said recording portion via said switches of said selector switch portion to reproduce the image on a recording paper sheet fed by said first paper feeding roller.

4. An image reading/recording apparatus set forth in claim 1 wherein said substrate is a transparent substrate, said first paper feeding roller is a paper feeding roller for feeding a recording paper sheet and is provided in the vicinity of said contact-type one-dimensional recording head, and said apparatus has a second paper feeding roller provided on the opposite side of said transparent substrate and in the vicinity of said contact-type one-dimensional image sensor for feeding a subject copy.

5. An image reading/recording apparatus set forth in claim 4 wherein said apparatus has means so that it can be operated as a copying machine in such a manner that both said amplifiers of said reading portion and said amplifiers of said recording portion are switched over to an operating state, image information read through said transparent substrate by said reading elements from said subject copy fed by said second paper feeding roller is sent to said recording elements via said amplifiers of said reading and recording portions, and the image is reproduced on a recording paper sheet fed by said first paper feeding roller.

6. An image reading/recording apparatus set forth in claim 4 wherein said apparatus has means so that it can be operated as a facsimile unit in such a manner that,
  in transmission, said amplifiers of said reading portion are switched over to an operating state and said amplifiers of said recording portion are switched over to a non-operating state, said contact-type one-dimensional image sensor is operated to read the image of a subject copy through said transparent substrate, the subject copy being fed by said second paper feeding roller, and image information obtained by said contact-type one-dimensional image sensor is output from said data input/output terminal via said amplifiers of said reading portion and said switches of said selector switch portion,
  in receiving, said amplifiers of said reading portion are switched over to a non-operating state and said amplifiers of said recording portion are switched over to an operating state, and said contact-type one-dimensional recording head is operated so that image information sent to said data input/output terminal is input to said amplifiers of said recording portion via said switches of said selector switch portion to reproduce the image on a recording paper sheet fed by said first paper feeding roller.

7. An image reading/recording apparatus set forth in claim 1 wherein said substrate is a transparent substrate, said first paper feeding roller is a paper feeding roller for feeding a recording paper sheet and is provided in the vicinity of said contact-type one-dimensional recording head, and said apparatus having a self-travelling roller for causing said apparatus to travel, with a rotating surface that protrudes slightly from an underside of said apparatus, said self-travelling roller being forced onto said first paper feeding roller so as to be capable of rotating as said first paper feeding roller rotates.

8. An image reading/recording apparatus set forth in claim 7 wherein said apparatus has means so that it can be operated as a copying machine in such a manner that both said amplifiers of said reading portion and said amplifiers of said recording portion are switched over to an operating state, said apparatus is moved over a subject copy by rotation of said self-travelling roller, image information read through said transparent substrate by said reading elements from the subject copy placed under said apparatus is sent to said recording elements via said amplifiers of said reading and recording portions, and an image is reproduced on the recording paper sheet fed by said first paper feeding roller.

9. An image reading/recording apparatus set forth in claim 7 wherein said apparatus has means so that it can be operated as a facsimile unit in such a manner that, in transmission, said amplifiers of said reading portion are switched over to an operating state and said amplifiers of said recording portion are switched over to a non-operating state, said apparatus is moved over a subject copy by rotation of said self-travelling roller, said contact-type onedimensional image sensor is operated to read the image of the subject copy through said transparent substrate, the subject copy being placed under said apparatus, and image information obtained by said contact-type one-dimensional image sensor is output from said data input/output terminal via said amplifiers of said reading portion and said switches of said selector switch portion, in receiving, said amplifiers of said reading portion are switched over to a non-operating state and said amplifiers of said recording portion are switched over to an operating state, and said contact-type one-dimensional recording head is operated so that image information sent to said data input/output terminal is input to said amplifiers of said recording portion via said switches of said selector switch portion to reproduce the image on a recording paper sheet fed by said first paper feeding roller.

* * * * *